United States Patent Office 2,797,016
Patented June 25, 1957

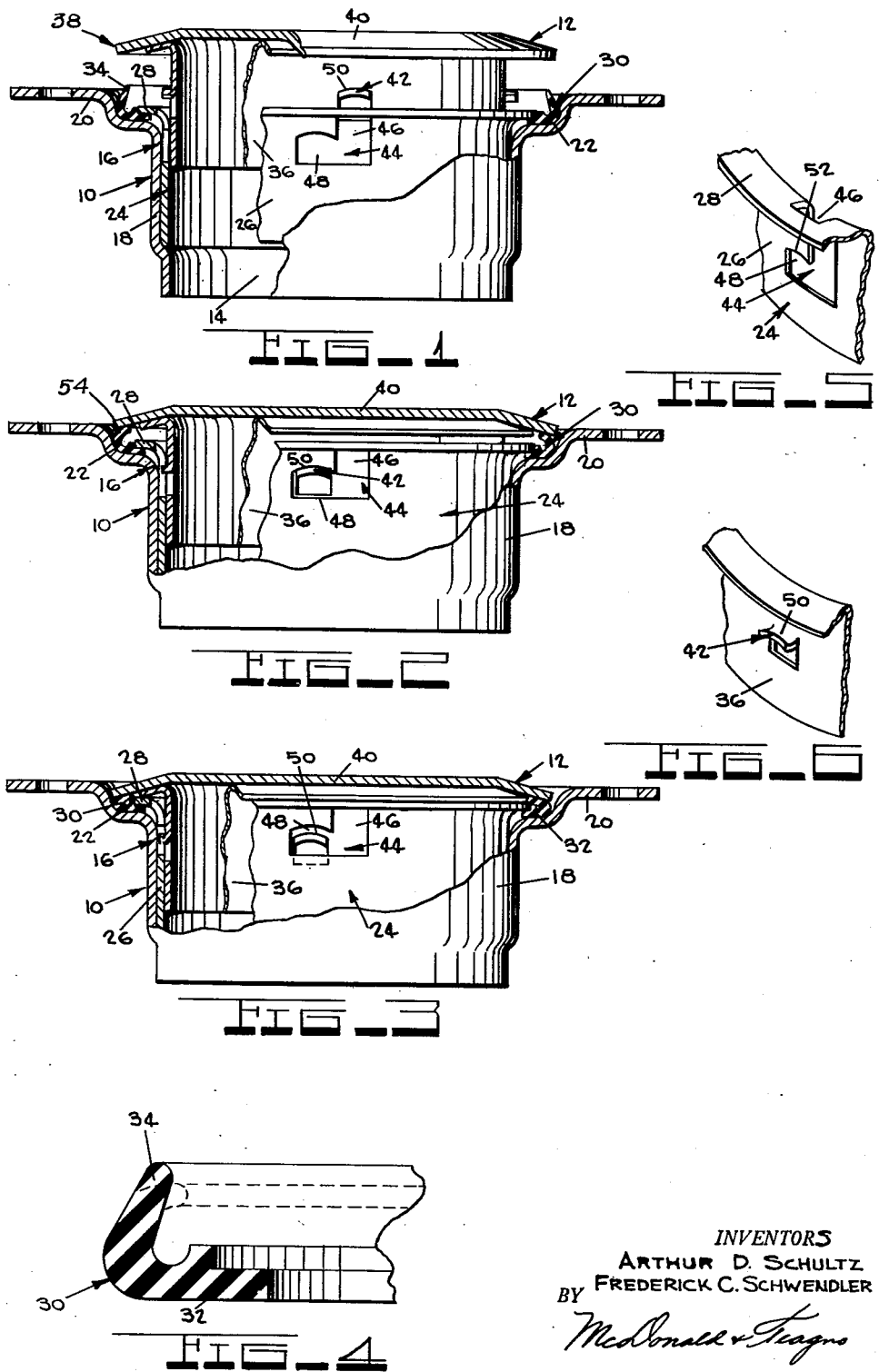

2,797,016
CLOSURE

Frederick C. Schwendler, Cleveland, and Arthur D. Schultz, Mayfield Heights, Ohio, assignors to Eaton Manufacturing Company, Cleveland, Ohio, a corporation of Ohio Application February 23, 1952, Serial No. 273,036

5 Claims. (Cl. 220—40)

This invention relates to closures and more particularly to fuel caps.

Broadly the invention comprehends the provision of closures for the application thereof to the filler openings of fuel tanks of aircraft and the like wherein the closures as installed have their outer surface substantially flush with the adjacent outside surfaces of the aircraft. Through the provision of novel annular seals incorporated in the filler necks of the tanks to which the closures are attached, water is effectively sealed out and through the permissible limited axial deflection of the closure as attached to the filler neck upon the application of axial pressure thereto, any ice formation around the periphery of the cap can be shattered when removal is required.

Among the principal objects of the invention are the provision of a fuel tank closure and filler neck arrangement, that:

1. Is of simple and economical construction;
2. Incorporates an annular flexible sealing member disposed between the filler neck and closure effective in a closed position of the closure to inhibit the passage of foreign matter into the fuel tank to which applied;
3. Permits of the axial deflection of the closure and a portion of the sealing member cooperating therewith to shatter any ice formation on the outside of the closure and filler neck; and
4. Permits of the easy removal of the closure from sealing position relative to filler neck and sealing member.

Other objects and advantages of the invention will appear from the following description taken in connection with the drawings forming a part of the specification, and in which:

Figs. 1 through 3 are side elevations partly broken away and partly sectionalized views of a closure and filler neck arrangement in varying positions of actuation of the closure and filler neck relative to one another.

Fig. 4 is a fragmentary cross-sectional view of the sealing member incorporated in the structure of Figs. 1 through 3;

Fig. 5 is a perspective view of the fastening slot in the filler neck; and

Fig. 6 is a perspective view of the means for fastening the closure to the filler neck by receipt thereof in the fastening slot of the filler neck of Fig. 5.

This fuel cap-filler neck arrangement was devised primarily for the purpose of insuring against the passage of water or other foreign matter into the fuel tank to which the arrangement is applied tending toward the contamination of the fuel in the tank. Furthermore in its application to fuel tanks of aircraft, provision for the axial deflection of the cap is permitted relative to the filler neck so that any ice which might accumulate on the outer surface of the aircraft adjacent to the cap and on the cap can be easily shattered thus allowing for an easy and quick removal of the cap as requirements dictate. As part of the arrangement an annular sealing member is interposed between the cap cover and the filler neck, with the member preferably secured to the filler neck and with an annular lip thereof engaging the undersurface of the cap cover when the cap is secured to the filler neck.

Referring to the drawings for more specific details of the invention 10 represents generally a filler neck adapted to be secured in an opening of a fuel tank, not shown, a closure or cap 12 adapted to be secured to the filler neck 10 for the purpose of closing the filler opening 14 therein.

The filler neck 10 comprises a flanged sleeve 16 including an axial portion 18 and a radial flange portion 20 providing an annular shoulder 22 at the junction thereof. A flanged sleeve 24 including an axial portion 26 telescopically received in the sleeve 16 and a radial flange portion 28 is fixedly secured to the filler neck.

An annular sealing member 30, seated on shoulder 22 of the filler neck includes an annular body portion 32 clamped to the filler neck 10 by flange portion 28 of sleeve 16 and a normally substantially axially extended annular lip portion 34, the purpose of which will hereinafter appear.

The cap 12 includes a sleeve 36 and a cover 38 fixedly secured to the sleeve, with an annular portion 40 of the cover extending radially beyond the outer diameter of the sleeve 36.

A plurality of equi-circumferentially spaced radially extended fingers 42 are provided on the external surface of the sleeve 36 intermediate the axial length thereof, said fingers being adapted to be received in slots 44 provided in the sleeve 24. The slots 44 are equal in number and similarly equi-circumferentially spaced as the fingers on the sleeve 36 and each include an entrance axially extended portion 46 and a right angle portion 48, the purpose of which will hereinafter appear. One face surface 50 of each finger is curved for securement purposes with side 52 of portion 48 of slot 44.

Fig. 1 illustrates the positioning of the cap 12 in the filler opening 14 of filler neck 10 wherein the sleeve 36 is received telescopically within the sleeve 24 with the fingers 42 about to enter portions 46 of slots 44.

Upon further axial movement of cap 12 relative to the filler neck 10, the fingers 42 enter portions 46 of slots 44 and pass axially therethrough whereupon after a predetermined axial movement of cap 12 the undersurface 54 of cover 38 engages lip portion 34 of the sealing member for sealing relation therewith. The cap 12 is then moved an additional axial amount until the junction of portions 46 and 48 of slots is reached. This axial movement of the cap serves to fold the annular lip portion 34 of the sealing member radially inwardly and thus provide a resilient sealing load between the sealing member and cover 38 as evidenced by the relation existing between the sealing member and cover for the locked together position of the cap and filler neck disclosed by Fig. 2.

The closed position of the cap and filler neck of Fig. 2 is attained through the rotation of the cap relative to the filler neck once the fingers have moved to a position at the junction of slot portions 46 and 48 whereupon the curved surfaces of the fingers 42 mate with the curved surfaces of sides 52 adjacent the slot portions 48 to secure the cover to the filler neck.

With the cap locked to the filler neck it is possible should ice accumulate upon the outer surface of cover 38, and the annular portion of the sealing member 30, merely by applying axial pressure to cover 38 of the cap, to shatter the ice through the permissible axial movement of the cap when in closed position wherein the annular lip portion 34 of the sealing member is further flexed and the fingers 42 move away from sides 52 adjacent slot portions 48 as disclosed in an ice shattering position of the cap and filler neck, Fig. 3.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. In combination a closure and fluid container filler neck, said closure having a cover member and a cylindrical body portion fixedly secured to the said cover member, an annular sealing element, fixedly secured on the filler neck adjacent a central opening thereof, having a resilient cross-sectionally tapered annular lip extending in an axial, radially inward direction relative to the filler neck with the free extremity thereof lying in closer proximity to a circumferential diameter corresponding with the maximum diameter of the element than to the said body, the said closure having a substantially radially extending annular portion near its outer periphery having axial engagement with the lip of the sealing element, said filler neck having a plurality of circumferentially spaced slots of like spacing and number to projections on the closure, said slots having communicating axial and right angular portions such that with the closure secured to the filler neck with the projections received in the right angular portions of the slots a further relative axial position is possible between the closure and filler neck effective to flex substantially all of the annular lip of the sealing element to a position parallel with the cover member when the said further relative axial position between the closure and filler neck is effected.

2. In combination a closure and fluid container filler neck, including an annular sealing element supported on the filler neck adjacent the opening thereinto, means for securing said closure to said filler neck, said annular sealing element being an annular substantially radially extended body portion fixedly secured to the filler neck and cross-sectionally tapered resilient annular lip extending normally axially and radially inwardly from the external periphery of the body with the free extremity thereof being the small end disposed in closer proximity to a circumference of like maximum diameter of the element than to the body, said lip having radially extending internal and external surfaces and said closure having a cover member, an end axial annular portion of which annularly engages the lip of the sealing element, effective upon securement of the closure to the filler neck to flex the lip of the sealing element radially inward and axially toward the body portion of the sealing element such that the said cross-sectionally tapered resilient annular lip lies parallel to the body of the sealing element and is capable of contact with the sealing element along a major portion of said external surface of the sealing element, said means including a plurality of substantially identical circumferentially spaced slots in the filler neck and an equal number of circumferentially spaced projections on the closure, adapted to be engageably received in the slots.

3. A combination according to claim 2 wherein each of the slots have communicating axial and right angular portions wherein the projections on the cover are axially receivable in the axial portion of the slots and rotatably receivable in the angular portions of the slots and wherein the projections on the closure have an axial length less than the axial width of the right angular portions of the slots permitting of the axial movement of the cover relative to the filler neck when the projections are in the angular portions of the slots effective to permit flexing of the lip of the sealing element with the closure secured to the filler neck.

4. A combination according to claim 3 wherein the axial minimum distance between the axial extremity of the lip of the sealing element and the right angular portion of the slots is greater than the axial minimum distance between the end axial portion of the cover member engageable with the lip of the sealing member and the projections.

5. In combination a closure fluid container filler neck including an annular sealing element supported on the filler neck adjacent the opening thereinto, means for securing said closure to said filler neck, said means permitting axial movement between said closure and filler neck after said securement, said annular sealing element being an annular substantially radially extended body portion fixedly secured to the filler neck and cross-sectionally tapered resilient annular lip extending normally axially and radially inwardly from the the external periphery of the body with the free extremity thereof being the small end disposed in closer proximity to a circumference of like maximum diameter of the element than to the body, said lip having radially extending internal and external surfaces and said closure having a cover member, an end axial annular portion of which annularly engages the lip of the sealing element, effective upon securement of the closure to the filler neck to flex the lip of the sealing element radially inward and axially toward the body portion of the sealing element such that the said cross-sectionally tapered resilient annular lip lies parallel to the body of the sealing element and is capable of contact with the sealing element along a major portion of the said external surface of the sealing element, said means including a plurality of substantially identical circumferentially spaced slots in the filler neck and an equal number of circumferentially spaced projections on the closure, adapted to be engageably received in the slots.

References Cited in the file of this patent

UNITED STATES PATENTS

| 566,983 | Sheriff | Dec. 22, 1925 |
| 1,593,846 | Reid | July 27, 1926 |
| 1,716,024 | Bell | June 4, 1929 |
| 1,933,135 | Barthelmes | Oct. 31, 1933 |
| 2,316,507 | Dykeman | Apr. 13, 1943 |
| 2,465,662 | Sanford | Mar. 29, 1949 |
| 2,582,801 | Steen | Jan. 15, 1952 |
| 2,602,563 | Lipski | July 6, 1952 |
| 2,706,577 | Wolf | Apr. 19, 1955 |